United States Patent [19]

Yalcin

[11] Patent Number: 5,687,745

[45] Date of Patent: Nov. 18, 1997

[54] EXHAUST GAS SCRUBBING DEVICE

[76] Inventor: Aslan Nuri Yalcin, Sonnenstr. 57, 48599 Gronau, Germany

[21] Appl. No.: 378,562

[22] Filed: Jan. 27, 1995

[30] Foreign Application Priority Data

Jan. 27, 1994 [DE] Germany ............... 44 02 316.2

[51] Int. Cl.$^6$ .................................................. A24F 1/14
[52] U.S. Cl. ................... 131/173; 131/185; 131/205; 55/204
[58] Field of Search ....................... 131/173, 185, 131/205; 55/223, 256, 204

[56] References Cited

U.S. PATENT DOCUMENTS

| | | | |
|---|---|---|---|
| 1,967,438 | 6/1934 | Hartzes | 131/173 |
| 3,315,687 | 4/1967 | Menges | 131/176 |
| 4,214,880 | 7/1980 | Kamphorst | 55/204 |

*Primary Examiner*—Vincent Millin
*Assistant Examiner*—Charles W. Anderson
*Attorney, Agent, or Firm*—Robert W. Becker & Associates

[57] ABSTRACT

An exhaust gas scrubbing device has a first chamber having an exhaust gas inlet. A second chamber has an exhaust gas outlet. A partition separates the first and the second chamber. A liquid is contained in the first and second chambers. A conveying device extends through the partition and is immersed in the liquid within the second chamber. The first and second chambers communicate via the conveying device. The exhaust gas, introduced into the first chamber through the gas inlet, is guided through the conveying device and through the liquid contained in the second chamber to the gas outlet and is scrubbed by passing through the liquid.

4 Claims, 3 Drawing Sheets

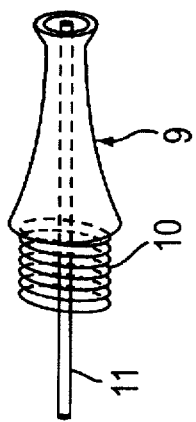
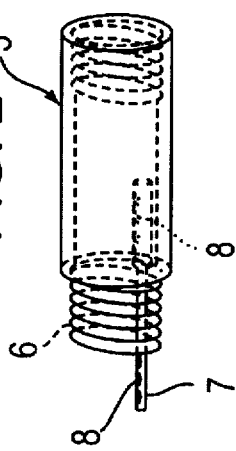
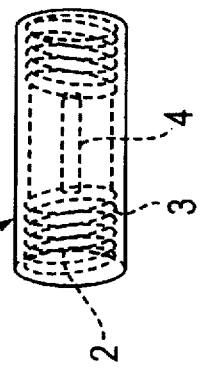
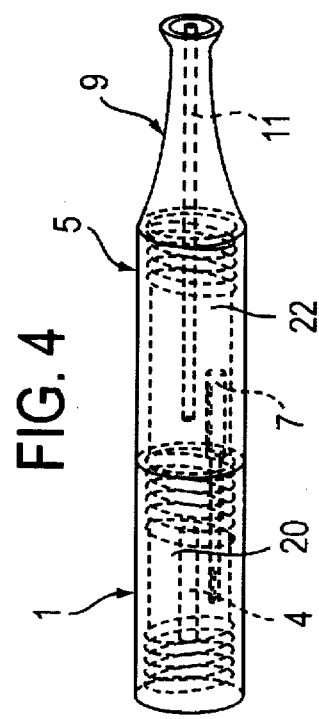
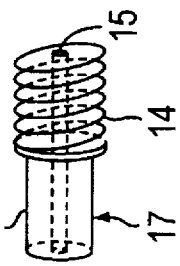
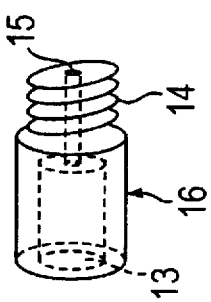
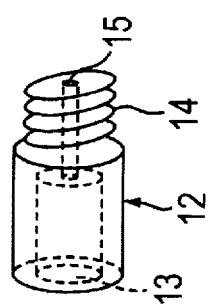

EXHAUST GAS SCRUBBING DEVICE

BACKGROUND OF THE INVENTION

The present invention relates to an exhaust gas scrubbing device with an exhaust gas inlet and an exhaust gas outlet as well as with a cleaning (scrubbing) arrangement between the exhaust gas inlet and the exhaust gas outlet.

Different exhaust gas cleaning devices for different purposes are known. For example, cleaning devices that operate with filters are known for cigarettes, cigars, pipes for smoking tabacco, and also for kitchen exhaust vents. Furthermore, exhaust gas cleaning devices equipped with catalysts are known in the automotive sector. The present invention relates to a scrubbing device that uses the cleaning power of liquids for removing contaminants from exhaust gases guided through the liquid. The term "exhaust gas" in the context of the present invention encompasses smoke from burning tabacco products, flue gases of power plants, exhaust gases from internal combustion engines etc., i.e., in general, any waste gas that requires cleaning or removal of contaminants or pollutants. In the context of the present invention the term "scrubbing" is used to refer to the removal of contaminants or pollutants from a gas by guiding the gas through a liquind in which the contaminants/pollutants are retained.

From German Gebrauchsmuster 76 34 082 a device of the aforementioned kind is known. In the disclosed cleaning device for exhaust gases, an exhaust pipe opens into a first chamber that is free of liquid. From the first chamber a bent pipe is guided into a second chamber that is filled with a liquid. The portion of the pipe that is positioned in the second chamber is submerged in the liquid. An outlet is arranged above the liquid level in the second chamber. The use of this device for scrubbing exhaust gases would have only a limited success since the residence time of the exhaust gas within the liquid is very short.

From U.S. Pat. No. 2,672,872 a cigarette mouth piece for smoking cigarettes is known that has a filtering action based on a liquid. The first chamber of this device is free of a liquid and a vertical pipe extends from the top into a liquid-filled second chamber. U.S. Pat. No. 3,315,687 shows a filter insert for a mouth piece for smoking cigarettes that also operates with a liquid scrubbing medium. An inlet pipe has a transition into vertical channels which open into a liquid that is provided at the bottom of the insert. The cigarette smoke that is to be scrubbed penetrates the liquid when exiting from the channels and leaves the liquid upwardly at a slant. The gas flow is then guided into an outlet tube.

It is an object of the present invention to provide a device of a simple construction with which exhaust gases can be cleaned (scrubbed) very effectively by being guided through a liquid.

SUMMARY OF THE INVENTION

An exhaust gas scrubbing device according to the present invention is primarily characterized by:

A first chamber having an exhaust gas inlet;

A second chamber having an exhaust gas outlet;

A partition separating the first and the second chambers;

A liquid contained in the first and second chambers;

A conveying device extending through the partition and immersed in the liquid in the second chamber;

The first and second chambers communicating via the conveying device;

Wherein the exhaust gas, introduced into the chamber through the gas inlet, is guided through the conveying device and through the liquid contained in the second chamber to the gas outlet and is scrubbed by passing through the liquid.

Preferably, the exhaust gas scrubbing device according to the present invention comprises in a first embodiment a tubular container with a tubular wall having a first and a second end. The first end is closed off by a recessed end wall such that an annular projection is formed. The second end is open. An adaptor for receiving a device for smoking tobacco is provided which is engaged by the annular projection. An intermediate tubular member with a tubular wall having a first and a second end is provided. The first end is closed off by a projecting head and the second end is open. A mouthpiece with a connector and a free end is provided, and the connector is connected to the open end of the intermediate tubular members. The projecting head is inserted into the second end of the tubular container. The projecting head forms the partition and the first chamber is delimited by the tubular wall of the tubular container, the end wall, and the projecting head. The second chamber is the interior of the intermediate tubular member. The exhaust gas inlet is formed by a tube extending through the end wall and projecting into the first chamber.

Advantageously, the conveying device is a pipe member with radially extending bores.

Expediently, the exhaust gas outlet is a tube extending from the interior of the intermediate member to the free end of the mouthpiece.

Expediently, the adaptor, the tubular container, the intermediate tubular member, and the mouthpiece are connected to one another with screw connections.

In another embodiment of the present invention the exhaust gas scrubbing device comprises a closed container, wherein the partition is located substantially vertically in the closed container and divides the closed container so as to form the first and second chambers. The exhaust gas inlet is positioned at the upper end of the first chamber and the exhaust gas outlet is positioned at the upper end of the second chamber. The conveying device is comprised of bores at the lower end of the partition and pipes extending substantially horizontally from the bores into the second chamber. The pipes are tightly connected to the bores. The pipes have radially extending holes.

Preferably, the exhaust gas scrubbing device according to this embodiment further comprises a device for maintaining the liquid at a constant level.

This exhaust gas scrubbing device is preferably used for scrubbing exhaust gas of an internal combustion engine and further comprises a cooling device for cooling the exhaust gas introduced into the closed container.

In yet another embodiment of the present invention the exhaust gas scrubbing device comprises three concentrically and substantially vertically arranged pipe sections. An outer one of the pipe sections is closed off at the bottom with a base plate and has an upper open end. An inner one of the pipe sections extends through the base plate and is open at both ends. A lower end of the inner pipe section forms the exhaust gas inlet. A central pipe section forms the partition and is tightly connected with its lower end to the base plate. It is closed off at the upper end. The conveying device is in the form of bores provided at the lower portion of the central pipe section and pipes extending from the bores radially outwardly. The pipes have radially positioned holes. The interior of the central pipe section forms the first chamber and the interior of the outer pipe section deliminted inwardly by the central pipe section forms the second chamber. The upper open end of the outer pipe section forms the exhaust gas outlet.

Advantageously, the exhaust gas scrubbing device of this embodiment further comprises a hood with a suction device connected to the upper open end of the outer pipe section.

Expediently, the exhaust gas scrubbing device of this embodiment further comprises a device for recirculating the liquid through a radiator.

In all of the embodiments described the liquid is preferably water.

With the inventive embodiments of the scrubbing device it is achieved that the exhaust gas guided into the first chamber comes into intensive contact with the liquid. Due to high pressure in the first chamber or vacuum in the second chamber (first embodiment), the liquid in the first chamber is displaced into the second chamber until the conveying device is freed of liquid in the first chamber. The exhaust can then enter the conveying device. It is introduced into the liquid in the second chamber and passes through the liquid to undergo the scrubbing action. When leaving the liquid, it exits through the exhaust gas outlet. During the scrubbing process, the liquid has the tendency to equilibrate the liquid levels in the first and second chambers, i.e., to return to the first chamber from which it has been displaced, and this results in an intensive contact between exhaust gas and liquid. Accordingly, an extraordinarily effective cleaning or scrubbing of the exhaust gas by dissolving or absorbing the contaminants in the liquid is achieved.

The first disclosed embodiment is suitable in connection with smoking tobacco products in the form of cigarettes, cigars, or loose tobacco smoked in a pipe.

The second embodiment can be used in connection with a motorized vehicle for cleaning the exhaust gases of the internal combustion engine.

The third embodiment is designed to be used for cleaning flue gases of stationary devices such as power plants, whereby with the suggested recirculation of the liquid it is possible to use heat transferred from the exhaust gas to the liquid for auxiliary heating purposes.

It should be noted that by providing the conveying device in the form of pipes or tubes with radial holes, a high gas throughput can be achieved with small flow resistance especially in the second embodiment while maintaining a very good scrubbing effect.

BRIEF DESCRIPTION OF THE DRAWINGS

The object and advantages of the present invention will appear more clearly from the following specification in conjunction with the accompanying drawings, in which:

FIG. 1 shows the tubular container of the first embodiment;

FIG. 2 shows the intermediate tubular member of the first embodiment;

FIG. 3 shows the mouthpiece of the first embodiment;

FIG. 4 shows the components of FIGS. 1 to 3 in the mounted state;

FIG. 5 shows a cigarette adaptor;

FIG. 6 shows a cigar adaptor;

FIG. 7 shows a pipe adaptor;

DESCRIPTION OF PREFERRED EMBODIMENTS

Figure 8:
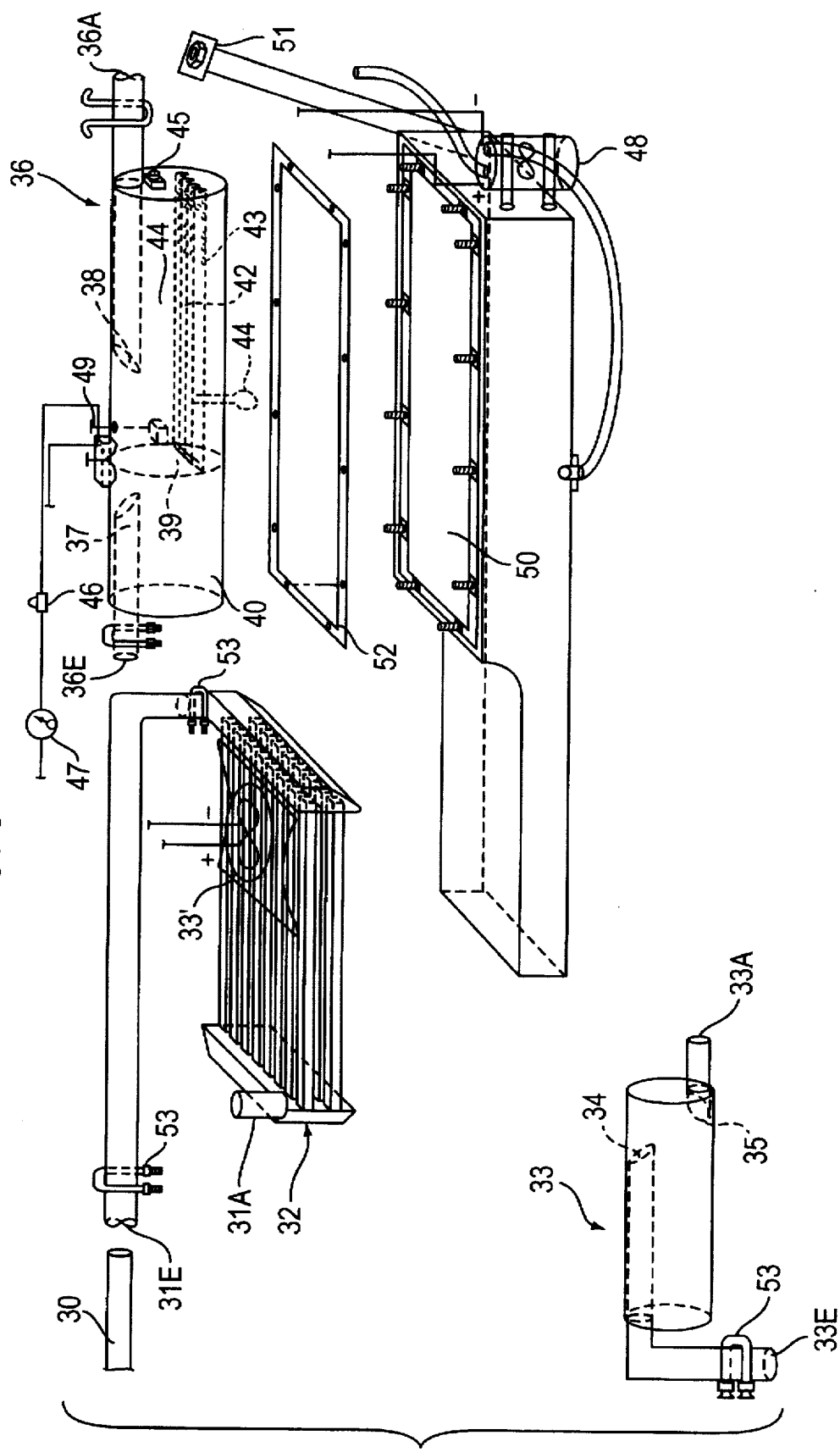
FIG. 8 shows a schematic representation of the second embodiment of the present invention for the use in connection with internal combustion engines of motorized vehicles.

The present invention will now be described in detail with aid of several specific embodiments utilizing FIGS. 1 through 10.

In the following the first embodiment of the present invention a schematically represented in FIGS. 1 through 7 will be explained whereby these Figures show the embodiment approximately a 1:1 scale.

According to FIG. 1 the tubular container 1 is provided at both ends with an inner thread. The annular projection 2 at the left end of the tubular container 1 is provided with an end wall 3. From the center of the end wall a small tube 4 extends into the interior of the tubular container 1. When positioned upright with the annular projection 2 and end wall 3 facing downward, the tubular container 1 can be filled with water to the upper end of the tube 4.

According to FIG. 2 an intermediate tubular member 5 is provided that at the left hand side in the drawing is closed off by a projecting head 6 provided with an exterior thread and the right side of which is provided with an inner thread. The conveying device in the form of a tube member 7 extends through a hole provided in the head (partition) 6 and is provided at both ends with radial bores 8.

According to FIG. 3 a mouthpiece 9 is provided with a projection 10 having an outer thread. Through the mouthpiece 9 a tube 11 extends.

FIG. 4 shows the aforementioned components when screwed together. Before screwing the individual parts together, the tubular container 1 is filled with water to the upper end of the tube 4. Then the intermediate tubular member 5 is screwed into the tubular container 1. Subsequently, the mouthpiece 9 is screwed on. When the connected components are then placed in a horizontal position, as shown in FIG. 4, it is ensured that the tube member 7 is completely immersed in water but the tubes 4 and 11 are free of water. It is to be understood that the length of the individual tubes 4, 7, and 11 must be selected such that the tube member 7 at least on one side of the projecting head 6 where the bores 8 are located is completely immersed in water and that the ends of the tubes 4 and 11 are free of water when the entire arrangement is positioned in the horizontal position. In order to ensure proper functioning of the device, the tube member 7 must always be at the bottom. Various measures can be envisioned to ensure that the user always maintains the device in this position. A visual marker would be the simplest solution.

FIGS. 5, 6 and 7 show three different adapters which can be screwed into the annular projection 2 of the tubular container 1. FIG. 5 shows an adaptor 12 which on the left hand side is provided with a recess 13 for receiving a cigarette. The right hand side is provided with a head 14 having an exterior thread. Through the head 14 a bore 15 extends that is aligned with the tube 4 when screwed together.

The adaptor 16 of FIG. 6 corresponds to the adaptor of FIG. 5 but the recess 13 has a greater diameter for receiving a cigar.

The adaptor 17 according to FIG. 7 is provided with a projection having an outer surface 18 which can be slipped into the mouthpiece of a tobacco pipe.

All of the aforementioned components can be made of plastic, aluminum or brass or any other suitable material. For proper use, the arrangement according to FIG. 4 which has been filled with water is provided with the respective adaptor according to FIGS. 5, 6 or 7 for receiving a cigar, cigarette, or pipe etc. The device is extremely effective because the smoke entering the interior (first chamber) 20 (FIG. 4) through the pipe 4 is sucked due to the vacuum created at the mouthpiece 9 into the bores 8 of the tube member 7, is guided through the tube member 7 and passes through the water contained in the second chamber into the interior 22 of the intermediate tubular member 5. From there, the smoke, which has been freed of most of its contaminants that are now dissolved or absorbed in the water, will pass through the tube 11 into the mouth of the smoker.

After repeated use, the device can be dismantled, emptied, and refilled with fresh water. The entire device is very easy to handle and can be assembled in an uncomplicated manner and, when filled with water according to the FIG. 4, optionally with additionally screwed-in adaptors, can be carried in a coat pocket or a smoker's accessory set. It is understood that various other embodiments are possible such as, for example, changing the outer thread to an inner thread etc.

With the aid of FIG. 8 which shows the inventive device approximately at a scale of 1:10, in the following another embodiment of the inventive exhaust gas scrubbing device will be described.

An inlet 31E of a cooling device 32 is connected to the exhaust gas pipe 3. The cooling device 32 also has an outlet 31A. If desired, the cooling device can also be additionally cooled with an electric fan 33'. Downstream of the outlet 31A of the cooling device 32 a decoupling container 33 with an inlet 33E and an outlet 33A is provided. The inlet 33E opens at 34 into the upper portion of the decoupling container 33. The outlet 33A extends outwardly from the decoupling container 33 at the lower part 35. The decoupling container serves for expanding the exhaust gases and also to prevent water contained in the inventive device from entering the cooling device 32.

Downstream of the outlet 33A the gas scrubbing device proper is arranged which comprises a closed container 36 with an exhaust gas inlet 36E and an exhaust gas outlet 36A. Both inlet 36E and outlet 36A open into the upper part of the container 36 at 37 and 38, respectively. With a partition 39 the container 36 is divided into a first chamber 40 and a second chamber 41 whereby the first chamber 40 has approximately one third of the volume of the container 36. In the area of the lower half of the partition 39 bores are provided to which are welded approximately horizontally extending pipes 42. They extend along the length of the second chamber 41 and are provided at their last third of extension with downwardly extending radial bores 43. The pipes 42 together with the bores provided in the partition constitutes the conveying device.

The container 36 is filled with water to such an extent that the pipes 42 are completely immersed in water. In order to ensure that the water remains at a certain level, the device is provided with a level compensator with a return valve 44 and a fresh water inlet 45. When a lamp 46 indicates a certain water level and a certain temperature 20, the water pump 48 refills water into the container. In the case of freezing of the water within the container, the two chambers 40 and 41 can be connected manually to a bypass 49 until the water is molten.

A water reservoir 50 is provided with a pump 48 and has a closure means 51 for refilling with water. It is understood that the water reservoir 50 is provided with a water level indicator and can be connected in a manner known per se to the vehicle bottom by using a sealing 52.

The individual components are preferably comprised of stainless steel, stainless steel sheet etc., or light metal such as aluminum. They can be connected in a manner known per se to the body of a vehicle and are connected to one another by inserting the respective tubes into one another and fastening the tube connections with clamps 53.

Exhaust gas that is produced in internal combustion engines such as diesel or gasoline engines is guided through the cooling device 32 and the decoupling container 33 into the first chamber 40. From their the cooled exhaust gas is guided into the tubes 42 and through the holes 43 into the liquid-filled second chamber 41 from where the gas exits through the outlet 36A. After passing through the water the exhaust gas is reliably cleaned. Furthermore, the entire device results in a considerable reduction of exhaust noise. It is understood that the water, when needed, is completely renewed.

The pipes 42 can be arranged such that they extend through the partition 39 into the first chamber 40. This increases the reliability of the device especially during acceleration, uphill climbs etc. Furthermore, it is possible to connect a plurality of containers 36 in series and to connect their water chambers to one another in order to increase the reliability of the device.

With the aid of FIGS. 9 and 10 a third embodiment of the inventive exhaust gas scrubbing device will be described.

Figure 9:
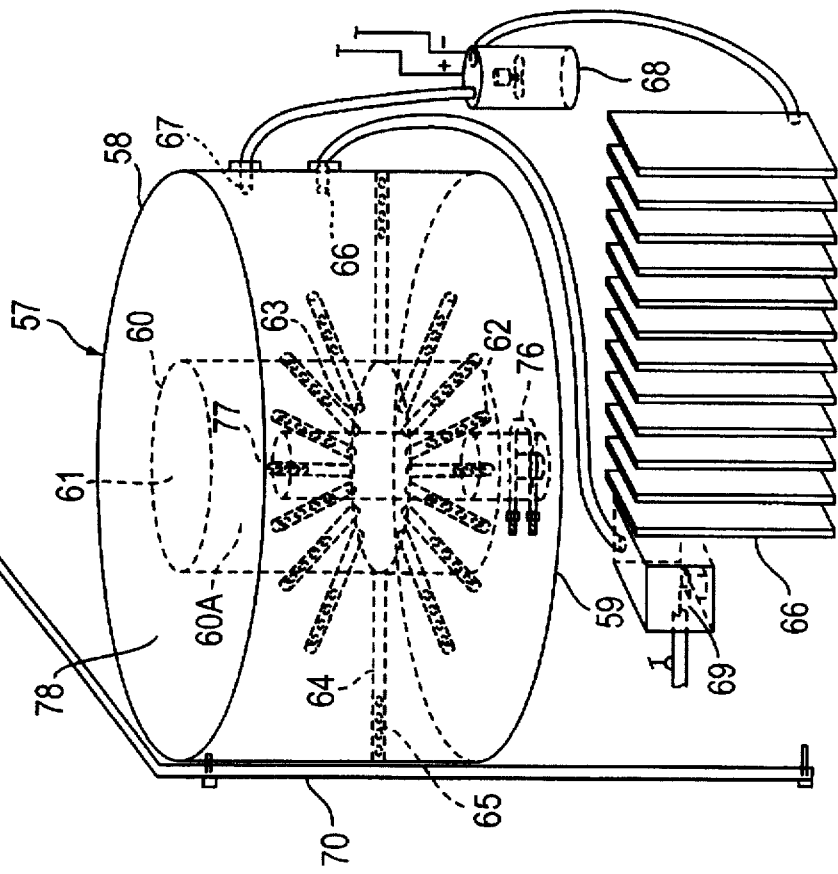
FIG. 9 is a schematic representation of a third embodiment for use with stationary devices for the purpose of exhaust gas scrubbing.

According to FIG. 9 the embodiment represented (approximately at a 1:10 scale) has a central component in the form of a container 57 which is comprised of three concentrically arranged pipe sections. The container has a height to diameter ratio of approximately 1:3 and is advantageously comprised of stainless steel.

The outer pipe section 58 is welded with its lower end to a base plate 59. Concentric thereto the central pipe section 60 is welded to the base plate 59 with its lower rim. The central pipe section 60 is closed at its upper end with a lid 61 preferably by welding and its length is identical to the length of the outer pipe section 58. Concentric to the central pipe section 60 an inner pipe section 62 extends through a hole in the center of the base plate 59 and is with its outer circumference tightly welded to the base plate 59. The inner pipe section 52 is open at the bottom and at the top and extends into the upper area of the central pipe section 60. The central pipe section 60 provides the partition between the first chamber, the interior of the pipe section 60, and the second chamber, the interior of the outer pipe section 58 delimited inwardly by the pipe section 60.

At approximately one third of its height the central pipe section 60 is provided with radial holes 63 (for example, 16 such holes 63 are distributed over the circumference). Pipes 64 that are tightly welded to the central pipe section 60 extend substantially horizontally from the central pipe section 60 and together with the holes 63 form the conveying device. Each of the pipes 64 extends into the direction of the tubular wall of the outer pipe section 58 and is provided with radial holes 65 within the last third of its extension.

At half the height of the exterior pipe section 58 a recirculating line 66' is provided that is connected to a radiator 66. A water pump 68 is arranged in a return line 67 that is connected between the radiator 66 and the upper area of the outer pipe section 58. The container 57 is filled with water to such a level that the pipes 64 are reliably immersed in water. When the water level drops, water can be reintroduced via a refill valve 69.

The entire container can be connected in a manner known per se to a frame 70.

Figure 10:
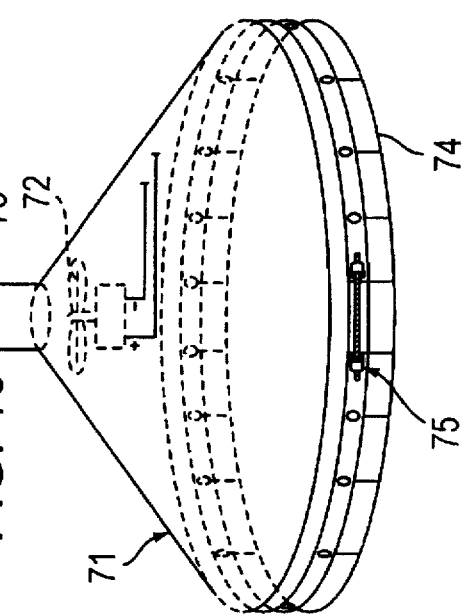
FIG. 10 shows a hood to be used in connection with the device of FIG. 9.

FIG. 10 shows a hood 71 with a blower 72 connected therein and with an outlet pipe 73. The periphery 74 of the hood 71 can be connected to a smoke stack and can be fastened thereat with clamping screws 57. The outlet pipe 73 is then inserted into the lower end of the inner pipe section 62 and is fastened thereat with clamping elements 76.

A further hood 71 can be connected to the exterior pipe section 58 and can be connected thereto with clamping screws 75. It is also possible to employ a hood 71 only at the pipe section 58.

The functioning of the aforedescribed device will be explained in the following. Exhaust gas from a smoke stack, chimney etc. enters from the bottom the pipe section 62 and leaves the pipe section at 77 in order to enter the interior of the central pipe section 60 (first chamber). With the aid of one or more blowers 72 the exhaust gas is then forced through the pipes 64 and their holes 65 in order to enter the interior 78 (second chamber) of the exterior pipe section 58. From here the exhaust gas is directly (or via hood 71) released into the atmosphere. The exhaust gas is reliably cleaned by this process. At the same time, heat is transferred from the exhaust gas to the water and the recaptured heat can be used for heating the radiator, i.e., providing auxiliary heat.

The present invention is, of course, in no way restricted to the specific disclosure of the specification and drawings, but also encompasses any modifications within the scope of the appended claims.

What I claim is:

1. A device for scrubbing tobacco smoke to be inhaled by a smoker, said device comprising:

a first chamber having a smoke inlet;

a second chamber having a smoke outlet;

an adapter for receiving a device for smoking tobacco connected to said smoke inlet;

a mouthpiece connected to said smoke outlet;

a partition separating said first and said second chambers;

a liquid contained in said first and second chambers to form a liquid level such that said smoke inlet and said smoke outlet are positioned above said liquid level;

at least one pipe member extending through said partition and positioned so as to be submerged within said liquid in said first and said second chambers, said at least one pipe member having radially extending bores;

said first and second chambers communicating via said at least one pipe member;

wherein the smoke, introduced into said first chamber through said smoke inlet, is guided through said at least one pipe member to said smoke outlet and is scrubbed by passing through said liquid:

a tubular container with a tubular wall having a first and a second end, said first end closed off by a recessed end wall such that an annular projection is formed and said second end being open;

wherein said adapter engages said annular projection;

an intermediate tubular member with a tubular wall having a first and a second end, said first end closed off by a projecting head and said second end being open;

wherein said mouthpiece has a connector and a free end, said connector connected to said open end of said intermediate tubular member;

wherein said projecting head is inserted into said second end of said tubular container;

wherein said projecting head forms said partition and said first chamber is delimited by said tubular wall of said tubular container, said end wall and said projecting head;

wherein said second chamber is the interior of said intermediate tubular member; and wherein said exhaust gas inlet is formed by a tube extending through said end wall and projecting into said first chamber.

2. An exhaust gas scrubbing device according to claim 1, wherein said exhaust gas outlet is a tube extending from said interior of said intermediate tubular member to said free end of said mouthpiece.

3. An exhaust gas scrubbing device according to claim 1, wherein said adapter, said tubular container, said intermediate tubular member, and said mouth piece are connected to one another with screw connections.

4. An exhaust gas scrubbing device according to claim 1, wherein said liquid is water.

* * * * *